(12) United States Patent  (10) Patent No.: US 6,466,244 B2
Itoh  (45) Date of Patent: Oct. 15, 2002

(54) IMAGE FORMING APPARATUS

(75) Inventor: Isami Itoh, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/940,492

(22) Filed: Aug. 29, 2001

(65) Prior Publication Data
US 2002/0027591 A1 Mar. 7, 2002

(30) Foreign Application Priority Data
Sep. 1, 2000 (JP) ........................................ 2000-266088

(51) Int. Cl.$^7$ ........................ B41J 2/385; G03G 15/043; G03G 13/04
(52) U.S. Cl. ........................................... 347/132; 399/51
(58) Field of Search ............................. 399/48, 26, 51, 399/128; 347/132, 133, 246

(56) References Cited

U.S. PATENT DOCUMENTS

| 5,160,967 A | * | 11/1992 | Tonegawa |
| 5,459,492 A | * | 10/1995 | Venkateswar |
| 5,719,682 A | * | 2/1998 | Ventkateswar |
| 5,887,222 A | * | 3/1999 | Sako ........................... 399/51 |
| 6,108,499 A | * | 8/2000 | Cernusak ..................... 399/26 |

* cited by examiner

Primary Examiner—Susan S. Y. Lee
(74) Attorney, Agent, or Firm—Fitzpatrick, Cella, Harper & Scinto

(57) ABSTRACT

An image forming apparatus includes a photosensitive member, an exposure device for exposing the photosensitive member which has been charged, a storing device storing therein a characteristic table two-dimensionally representing the potential decay characteristic of the surface of the photosensitive member, and a control device for controlling the exposure device on the basis of the characteristic table stored in the storing device.

17 Claims, 7 Drawing Sheets

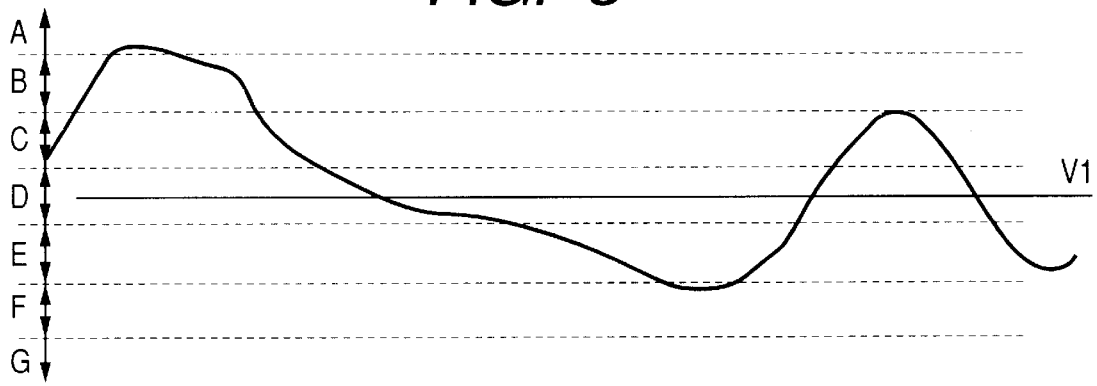

IMAGE FORMING APPARATUS

BACKGROUND OF THE INVENTION

1. Field of the Invention

The invention relates to an image forming apparatus such as a copier, a laser printer or a facsimile apparatus of the electrophotographic type.

2. Description of the Related Art

In image forming apparatuses of the electrophotographic type for electrostatically transferring a toner image electrostatically formed on the surface of a photosensitive member as an image bearing member to a recording material (e.g. paper) brought into close contact therewith, there is known one using an electrically conductive transfer roller or a corona charger as a transfer member.

In the image forming apparatus, the transfer member is urged against or brought close to the photosensitive member to thereby form a transferring portion between the photosensitive member and the transfer member, and the recording material is made to pass through the transferring portion and also, a transfer bias voltage opposite in polarity to the toner image on the photosensitive member is applied to the transfer member to thereby transfer the toner image on the photosensitive member to the surface of the recording material.

As the photosensitive member used in the above-described image forming apparatus, use is often made of an organic photoconductor (OPC photosensitive member or an amorphous silicon photoconductor (hereinafter referred to as the "a-Si photosensitive member"). Of these, the a-Si photosensitive member is high in surface hardness and exhibits high sensitivity to a semiconductor laser or the like and moreover, shows little or no sign of the deterioration by the repeated use thereof and therefore, is used as an electrophotographic photosensitive member in a high-speed copier, a laser beam printer (LBP) or the like.

The above-described a-Si photosensitive member, however, is manufactured by a method of making a gas into plasma by a high frequency or a microwave and solidifying it, and accumulating it on an aluminum cylinder and forming it into film and therefore, it is difficult to uniformize the plasma and place the aluminum cylinder on the center of the plasma, and it has been difficult to make the film forming condition accurate and uniform on the entire area of the surface of the photosensitive member. Therefore, at a developing position, uneven potential of the order of 20 V has occurred in the entire area of the surface of the photosensitive member, and this has led to the problem that uneven image density occurs due to this uneven potential.

The above-mentioned uneven potential occurs because (1) a difference in capacitance occurs from the uneven film thickness during film formation and a difference occurs to the charging capability, and (2) due to the localized difference in the quality of film attributable to the non-uniformity or the like of the film forming state, a difference occurs to the potential decay characteristic.

The above-described potential decay after charging is very great even in a dark state when the a-Si photosensitive member is used, as compared with the OPC photosensitive member, and further the potential decay of image exposure by an optical memory is increased and therefore, in order to extinguish the optical memory by the preceding image exposure, it becomes necessary to effect pre-exposure before charging.

The optical memory will be described here. When the a-Si photosensitive member is charged and image exposure is effected, an optical carrier is produced and the potential is decayed. At this time, however, the a-Si photosensitive member has much dangling bond (unconnected bond), and this becomes a localized level and catches a part of the optical carrier to thereby reduce its running property or reduced the reconnecting probability of an optically produced carrier. Accordingly, in the image forming process, as soon as an electric field is applied to the a-Si photosensitive member during the charging at the next step, a part of the optical carrier produced by exposure is liberated from the localized level, and in an exposed portion and a non-exposed portion, a difference occurs to the surface potential of the a-Si photosensitive member, and this finally becomes an optical memory.

So, it is popular to effect uniform exposure by an exposing device before charging to thereby make the optical carrier which is latent in the interior of the a-Si photosensitive member excessive so as to be uniform on the entire surface, and erase the optical memory. At this time, it is possible to increase the quantity of light of pre-exposure emitted from a pre-exposing device or approximate the wavelength of the pre-exposure to the spectral sensitivity peak (about 680–700 nm) of the a-Si photosensitive member to thereby erase the optical memory (ghost) more effectively.

However, when as described above, an uneven film thickness and the difference in potential decay characteristic by the difference in the quality of film exist in the a-Si photosensitive member, a difference occurs to the liberation of the optical carrier from the localized level because electric fields applied to between photoconductive layers differ from each other and therefore, even if the photosensitive member can be uniformly charged at a charging position, uneven potential will occur at a developing position. Also, disadvantage will occur to the charging capability because the capacitance becomes greater in the portions of smaller film thicknesses, and when the charging capability becomes lower, the uneven charging in the above-mentioned developing portion will become more remarkable.

For the reason as set forth above, the potential decay between charging and development becomes very great and potential decay of the order of 100–200 V occurs. At this time, uneven potential of the order of 10–20 V has occurred in the entire area of the surface of the photosensitive member due to the aforementioned uneven film thickness and the difference in the potential decay characteristic.

When such uneven potential occurs, the a-Si photosensitive member having great capacitance is more greatly affected thereby and uneven image density becomes remarkable because it is small in contrast as compared with the OPC photosensitive member.

SUMMARY OF THE INVENTION

It is an object of the present invention to provide an image forming apparatus which can form good images free of uneven image density.

It is another object of the present invention to provide an image forming apparatus including a photosensitive member, exposure means for exposing the photosensitive member which has been charged, storing means for storing therein a characteristic table two-dimensionally representing the potential decay characteristic of the surface of the photosensitive member, and control means for controlling the exposure means on the basis of the characteristic table stored in the storing means.

It is still another object of the present invention to provide an image forming apparatus including a movable photosensitive member, exposure means for exposing the photosensitive member which has been charged, storing means for storing therein the potential decay characteristic of the surface of the photosensitive member with respect to a direction orthogonal to the movement direction of the photosensitive member, and control means for controlling the exposure means on the basis of the potential decay characteristic stored in the storing means.

Further objects of the present invention will become apparent from the following description.

BRIEF DESCRIPTION OF THE DRAWINGS

FIG. 3 shows the distribution of the potential of the surface of a photosensitive drum after exposed.

FIG. 4 shows the potential levels of the surface of the photosensitive drum after exposed in the main scanning direction (longitudinal direction) and the sub-scanning direction (rotation direction).

DESCRIPTION OF THE PREFERRED EMBODIMENTS

An embodiment of the present invention will hereinafter be described with respect to the drawings.

Figure 1:
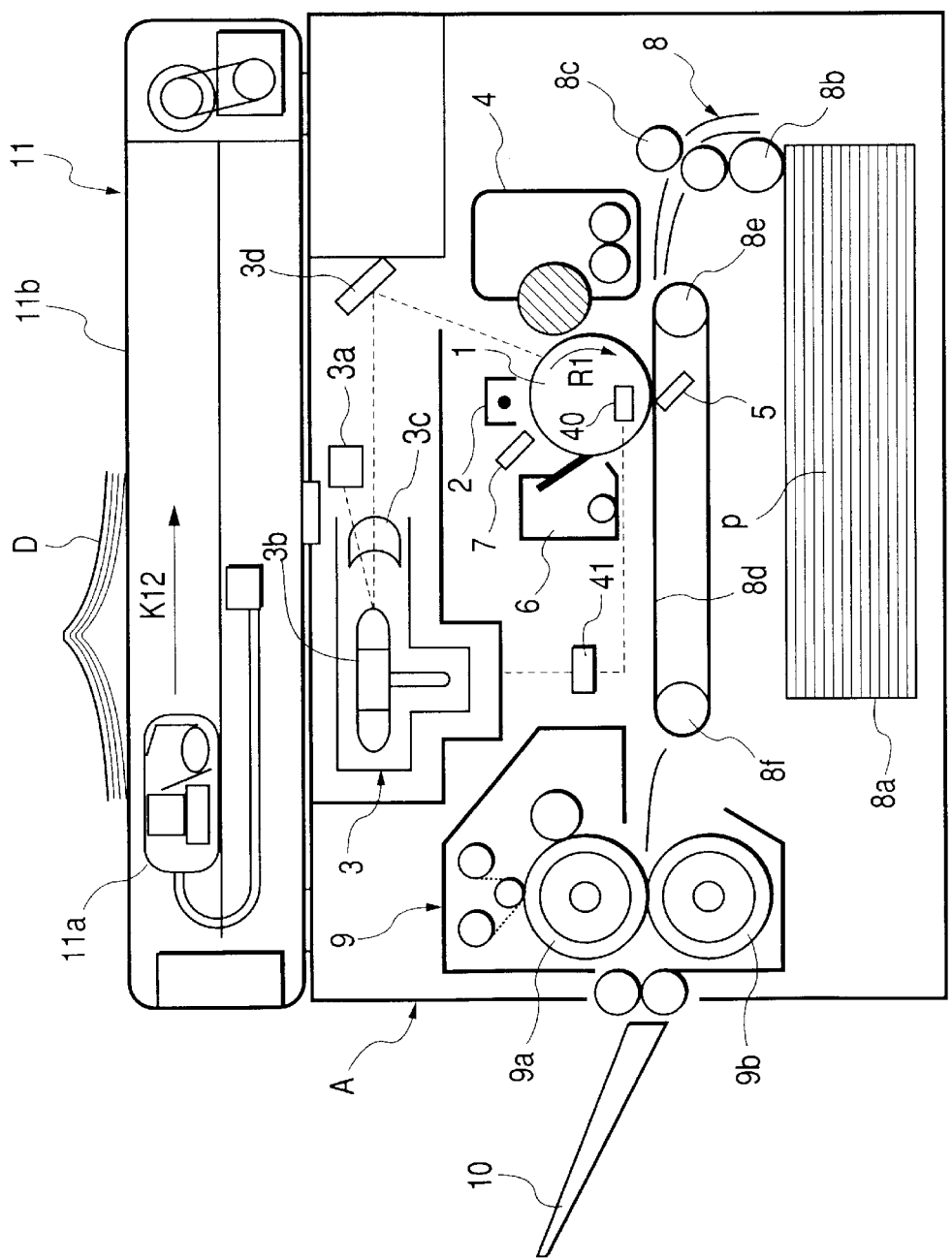
FIG. 1 is a longitudinal cross-sectional view schematically showing the construction of an image forming apparatus according to the present invention.

FIG. 1 shows an embodiment of an image forming apparatus according to the present invention. FIG. 1 is a longitudinal cross-sectional view schematically showing the construction of a laser beam printer as the image forming apparatus.

The image forming apparatus shown in FIG. 1 is provided with a drum-shaped electrophotographic photosensitive member (hereinafter referred to as the "photosensitive drum") 1 as image bearing member in the main body A of the image forming apparatus. Around the photosensitive drum 1, along the rotation direction thereof, there are disposed a charging device 2, an exposure device 3, a developing device 4, a transfer device 5, a cleaning device 6 and a pre-exposure device 7 substantially in the named order. Also, a feeding device 8, a fixing device 9 and a delivery tray 10 are disposed in succession from the upstream side along the conveyance direction of a recording material (e.g. paper) P, and an image reading device 11 is disposed in the upper portion of the main body A of the image forming apparatus.

The photosensitive drum 1 comprises an aluminum cylinder and an a-Si photosensitive member provided in the form of a layer on the outer peripheral surface thereof, and is rotatively driven in the direction of arrow R1 at a predetermined process speed by driving means (not shown). The photosensitive drum 1 will be described later in detail.

The photosensitive drum 1 has its surface uniformly charged to a predetermined polarity and predetermined potential by the charging device 2. As the charging device 2, use can be made for example, of a corona charger which is in non-contact with the photosensitive drum 1.

On the photosensitive drum 1 after charged, an electrostatic latent image is formed by the exposure device 3. The image reading device 11 has scanning means 11a provided with a light source movable in the direction of arrow K12 and a direction opposite thereto, and the light source irradiates the image bearing surface of an original D placed on an original glass stand 11b with its image bearing surface facing downward. Reflected light from the image bearing surface is read by a CCD through the intermediary of a reflecting mirror, a lens, etc., and the read image information is suitably processed and inputted to the exposure device 3. The exposure device 3 has a laser oscillator 3a, a polygon mirror 3b, a lens 3c, a reflecting mirror 3d, etc. and exposes the surface of the photosensitive drum 1 to light in conformity with the image information inputted from the image reading device 11 to form an electrostatic latent image.

The electrostatic latent image formed on the surface of the photosensitive drum 1 is developed as a toner image by the developing device 4 with a toner caused to adhere thereto. On the other hand, one of recording materials P contained in the feed cassette 8a of the feeding device 8 is fed by a feed roller 8b and is transported to and borne on the surface of a transfer belt 8d looped around a roller 8e and a roller 8f, by transport rollers 8c. The toner image formed on the photosensitive drum 1 by the developing device 4 is transferred to the surface of the recording material P on the transfer belt 8d by a transfer bias opposite in polarity to the toner image being applied to the transfer device 5.

The recording material P to which the toner image has been transferred is transported to the fixing device 9 by the transfer belt 8d, and there heat and pressure are applied thereto by a fixing roller 9a and a pressure roller 9b, whereby the toner image is fixed on the surface of the recording material P, whereafter the recording material P is delivered onto the delivery tray 10.

The photosensitive drum 1 comprised of an a-Si photosensitive member will now be described in detail with reference to FIGS. 5A, 5B, 5C, 5D, 5E and 5F. Any of these figures typically shows a part of that portion of a longitudinal cross-sectional view of the photosensitive drum 1 including the axis thereof which is located above the axis.

Figure 5A:
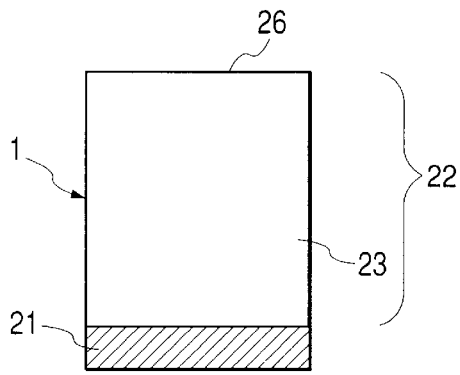
FIGS. 5A, 5B, 5C, 5D, 5E and 5F are longitudinal cross-sectional views showing the construction of the photosensitive member.

The photosensitive drum 1 shown in FIG. 5A is provided with a photosensitive layer 22 on the surface of a cylindrical drum (support member) 21 as a photosensitive member. The photosensitive layer 22 is comprised of a photoconductive layer 23 formed of a-Si:H, X (a non-single crystal material containing hydrogen atoms and halogen atoms with silicon atoms as base material) and having photoconductivity.

Figure 5B:
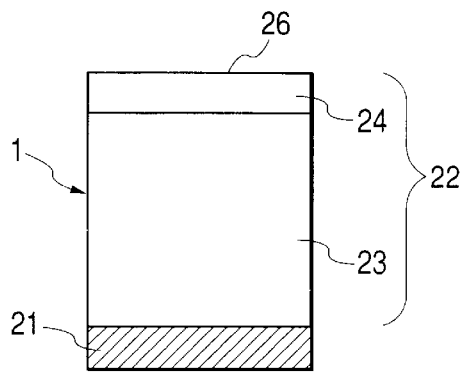
Figure 5C:
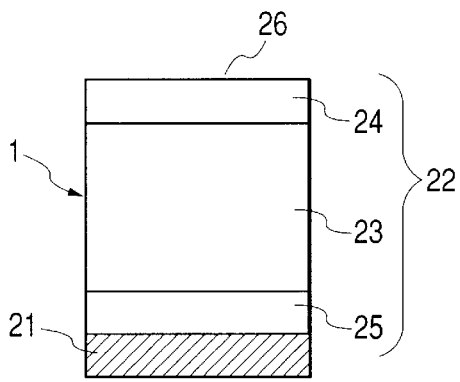
Figure 5D:
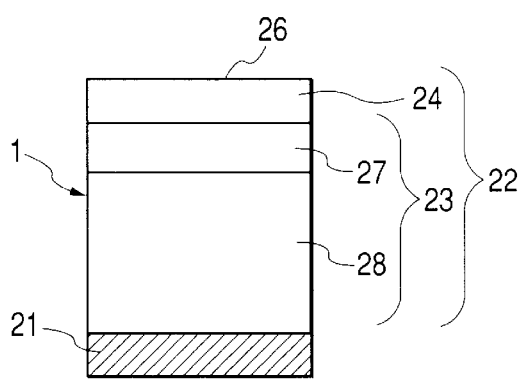
Figure 5E:
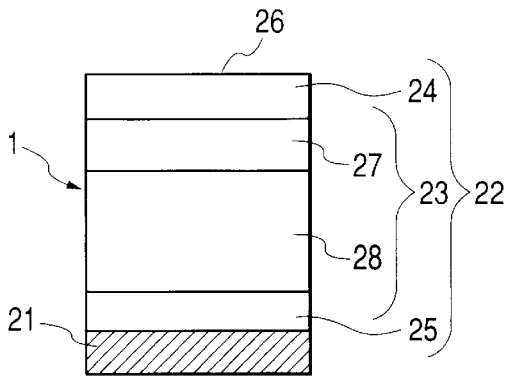
Figure 5F:
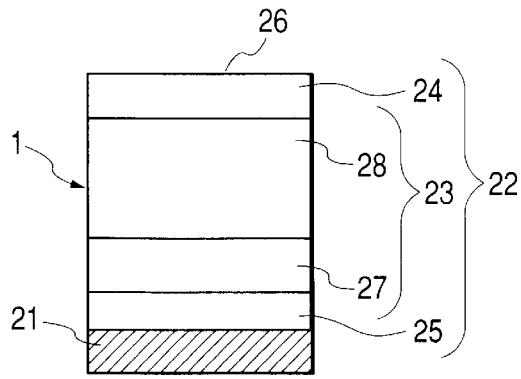

The photosensitive drum 1 shown in FIG. 5B is provided with a photosensitive layer 22 on the surface of an electrically conductive drum 21 formed of aluminum or the like as a photosensitive member. The photosensitive layer 22 is comprised of a photoconductive layer 23 formed of a-Si:H, X and having photoconductivity, and an a-Si surface layer 24.

Further, as shown in FIGS. 5C–5F, provision may be made of an a-Si charge blocking layer 25, and the photoconductive layer 23 may be comprised of a charge generation layer 27 and a charge transport layer 28 formed of a-Si:H, X and an a-Si surface layer 24.

The charge blocking layer 25 is provided, as required, in order to block the injection of charges from the electrically conductive drum 21 to the photoconductive layer 23. Also, the drum 21 may be electrically conductive in itself or may be electrically insulative one subjected to electrically conduction treatment.

The photoconductive layer 23 forming a portion of the photosensitive layer 22 is formed on an undercoat layer (not shown) on the drum 21, as required, and can be formed by a well-known thin film accumulating method such as the plasma CVD method (p-CVD method), the sputtering method, the vacuum deposition method, the ion plating method, the optical CVD method or the thermal CVD method. As the p-CVD method, use is made of one utilizing a frequency band such as RF band, VHF band or $\mu$M band, and the above-described layers are manufactured by a well-known apparatus and a well-known film forming method. In the present invention, the layer thickness of the photoconductive layer 23 is suitably determined as desired with the point that a desired electrophotographic characteristic is obtained, the point that the electric capacity in the used state is kept within the aforementioned range, and the point that there is an economical effect taken into account, and is preferably 20–50 $\mu$m.

The reference numeral 26 in FIGS. 5A–5F designates a free surface.

The features of the present invention will now be described. In the present invention, the following construction is adopted in order to eliminate uneven charging and further, uneven image density occurring due to the difference in the potential decay characteristic over the entire area of the surface of the a-Si photosensitive member.

The a-Si photosensitive member used as the photosensitive drum 1 in the present embodiment is designed to have its potential decay characteristic as a characteristic table in each a-Si photosensitive member during the manufacture thereof. That is, the surface of each a-Si photosensitive member is charged, whereafter it is exposed to a predetermined quantity of light at the exposing position by the exposure device, whereafter the surface potential of the a-Si photosensitive member at the developing position is recorded in a memory chip (storing means) 40 installed in the a-Si photosensitive member. This characteristic table is prepared by comparting the entire area of the surface of the a-Si photosensitive member into suitable blocks conforming to recording resolution in the main scanning direction (the longitudinal direction of the photosensitive member which is a direction orthogonal to the movement direction of the photosensitive member) and the sub-scanning direction (the rotation direction of the photosensitive member which is the movement direction of the photosensitive member) with respect to the light scanning direction of the exposure device 3, storing the potential decay in each block as data and preparing a potential decay characteristic map as a whole. That is, the storing means 40 stores therein a characteristic table two-dimensionally representing the potential decay characteristic of the surface of the photosensitive member.

As the compartment of the above-mentioned suitable blocks, for example, the entire surface of the photosensitive drum 1 (a-Si photosensitive member) is comparted into blocks of 10 mm×10 mm at the largest size. Actually, a block having 1 pixel size×1000 pixel of the recording resolution as a side is suitable. When the recording resolution is 400 dpi, 63.5 $\mu$m×1000=6.35 mm and therefore, the entire surface is divided into 6.35 mm×6.35 mm.

The preparation of this potential decay characteristic map need not be done with the a-Si photosensitive member mounted on the main body A of the image forming apparatus on which it is to be actually mounted.

The data of the potential decay characteristic map stored in this memory chip is read by the control device 41 of the main body A side of the image forming apparatus when the photosensitive drum 1 (a-Si photosensitive member) is set on the main body A of the image forming apparatus, and on the basis of the data of each block thereof, the amount of exposure light of the exposure device 3 (a laser used in the present embodiment) is changed in each block recorded in the potential decay characteristic map so as to provide uniform surface potential at the developing portion.

The correspondence between the potential decay characteristic map about the surface of the a-Si photosensitive member and the surface of the actual a-Si photosensitive member is set with a contact (to be described) for transferring data from the memory chip recording the data therein to the main body A of the image forming apparatus as the reference so that whenever the a-Si photosensitive member is stopped, the place thereof may be at a predetermined location.

Figure 6:
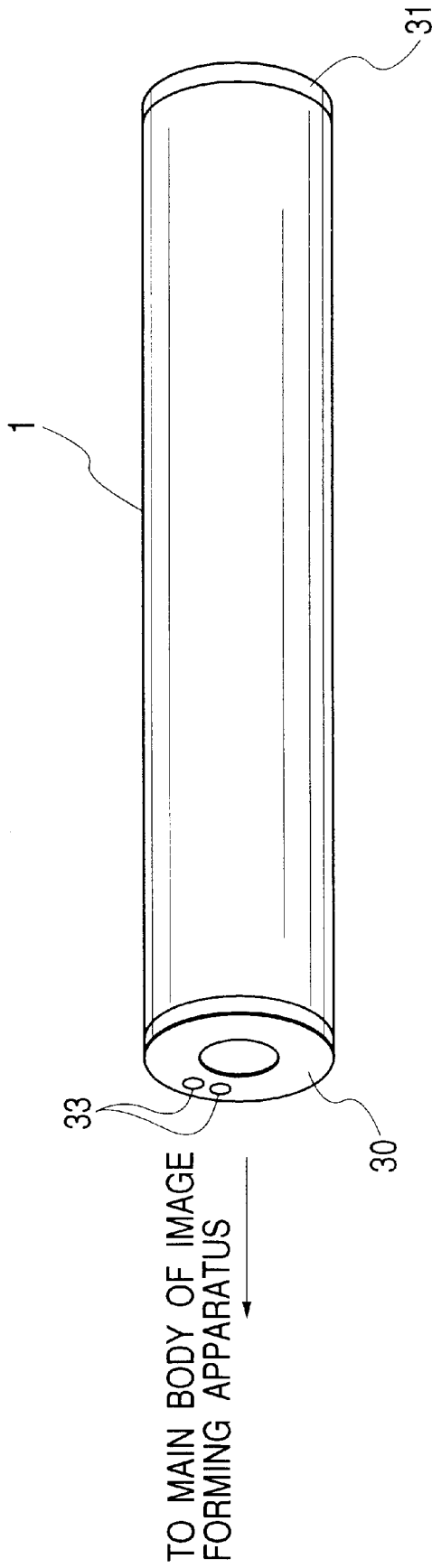
FIG. 6 is a perspective view showing contacts provided on the flange of the photosensitive drum 1.
Figure 7A:
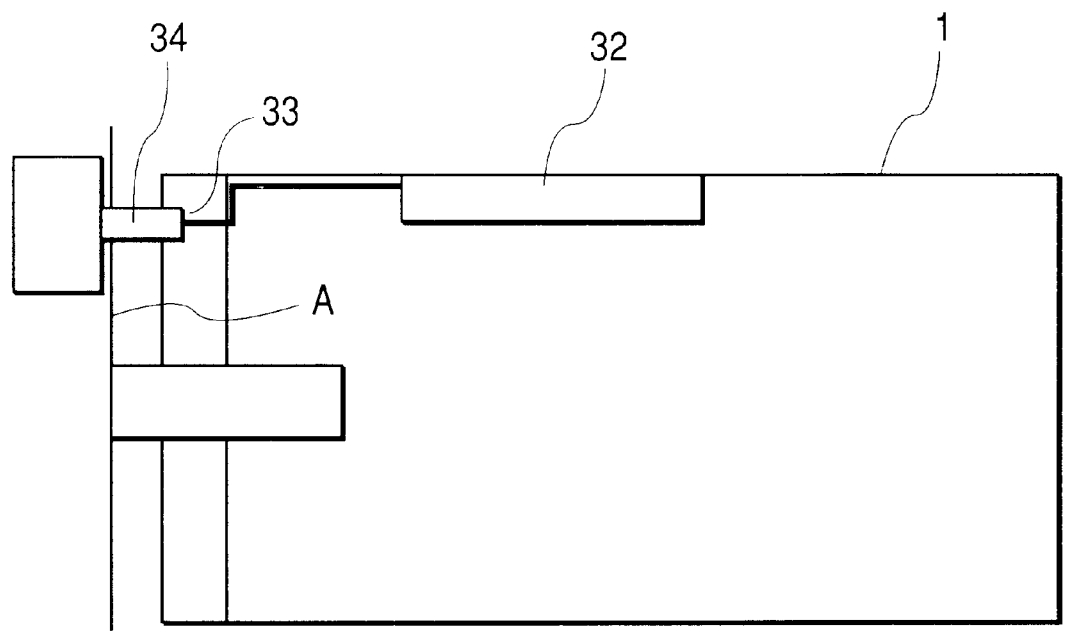
FIG. 7A is a longitudinal cross-sectional view showing a state in which the photosensitive drum is stopped and the contact on the photosensitive drum side and a pin on the main body side of the image forming apparatus are connected together.
Figure 7B:
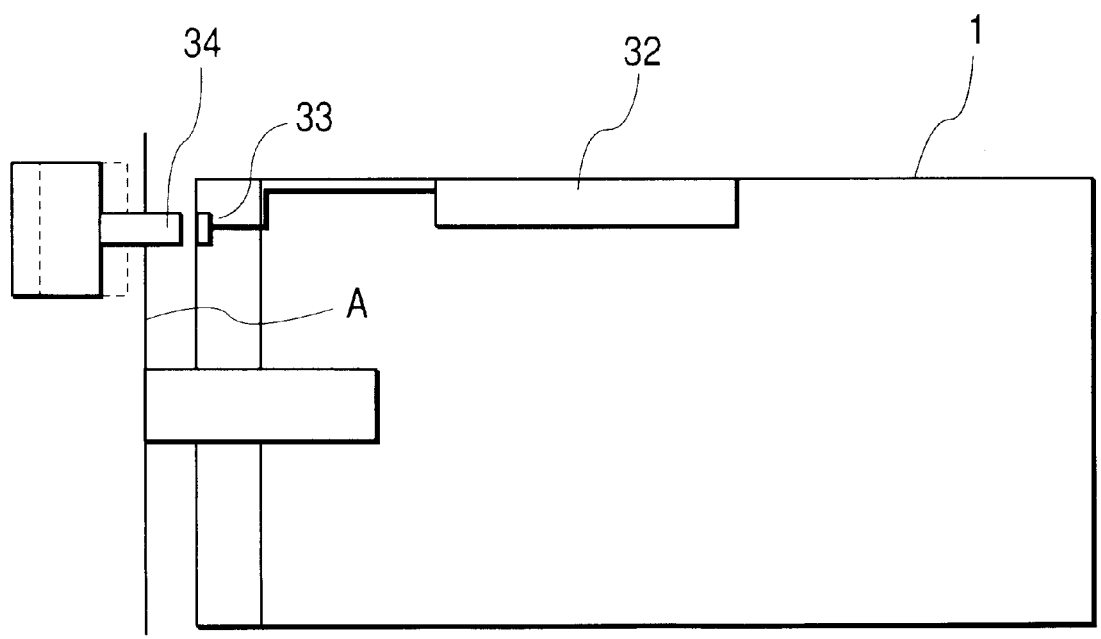
FIG. 7B is a longitudinal cross-sectional view showing a state in which the pin is disconnected from the contact and the photosensitive drum has become rotatable.

As shown in FIG. 6, of flanges 30 and 31 attached to the axially opposite end portions of the photosensitive drum 1 which is the a-Si photosensitive member, the flange 30 on the leading end side when the photosensitive drum 1 is mounted on the main body A of the image forming apparatus is provided with contacts 33 to a memory chip 32 (see FIG. 7A) in the drum. The main body A of the image forming apparatus reads block data about the charging characteristic of the mounted photosensitive drum 1 from the memory chip 32 through these contacts 33. These contacts 33 serve also as means for detecting positional information. As a method, the state of FIG. 7A is the state during the stoppage of the photosensitive drum and a memory data reading pin 34 disposed on the main body A side of the image forming apparatus is pressed against and fixed to the contacts 33, but during the driving of the photosensitive drum shown in FIG. 7B, the pin 34 is released from pressure and is separate from the contacts 33 and accordingly, the photosensitive drum 1 is free and rotatable. When the photosensitive drum 1 so far rotated is to be stopped, the pin 34 is pressed and fixed to the contacts 33 immediately before the stoppage of the photosensitive drum 1 so that the photosensitive drum 1 may be stopped.

Figure 8:
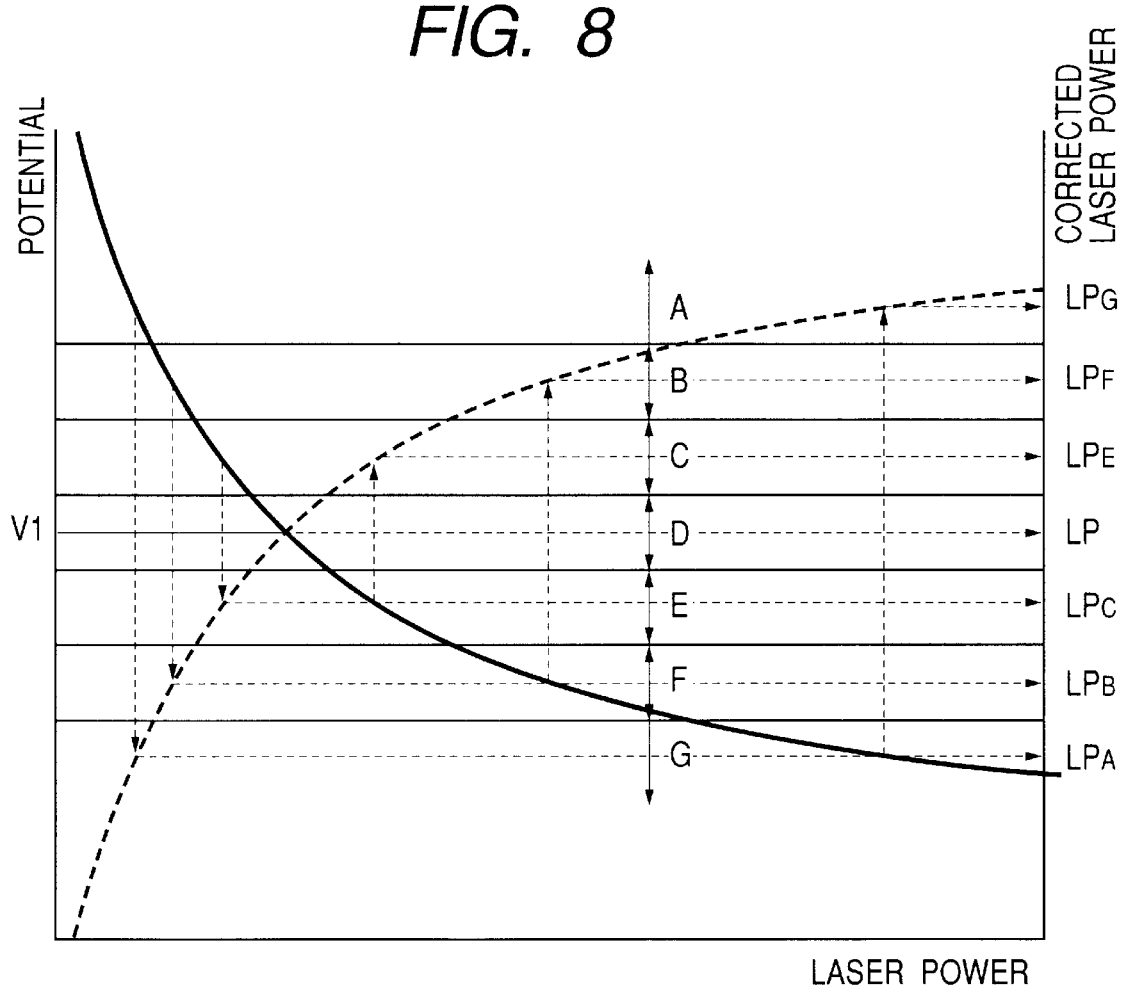
FIG. 8 is a graph showing the relation (EV curve) between the amount of exposure light and potential of the photosensitive member.

Reference is now had to FIG. 8 to describe the correspondence relation between the blocks set on the surface of the photosensitive drum and image data made into blocks. In FIG. 8, the axis of abscissas represents the exposure light amount (laser power) and the axis of ordinates represents the surface potential of the photosensitive drum. In FIG. 8, the solid line indicates the graph (EV curve) of the exposure light amount vs. potential of the photosensitive drum used, and the broken line indicates the graph of the inverse number thereof. The set potential after exposure is V1, and the then exposure light amount is LP. On the basis of this EV curve, the potential is divided into A, B, C, D, E, F and G. Potential for correcting the potential of the central value of the ranges A–G to V1 is $LP_A$, $LP_B$, $LP_C$, LP, $LP_E$, $LP_F$ and $LP_G$ shown in the right-hand axis of ordinates pointed to by horizontal rightward arrows. This corrected exposure light amount is defined as the exposure light amount of each block of the surface of the photosensitive drum, and the image of an area corresponding to the block recorded on the memory chip 32 is defined as the exposure light amount when exposure is effected.

Figure 2:
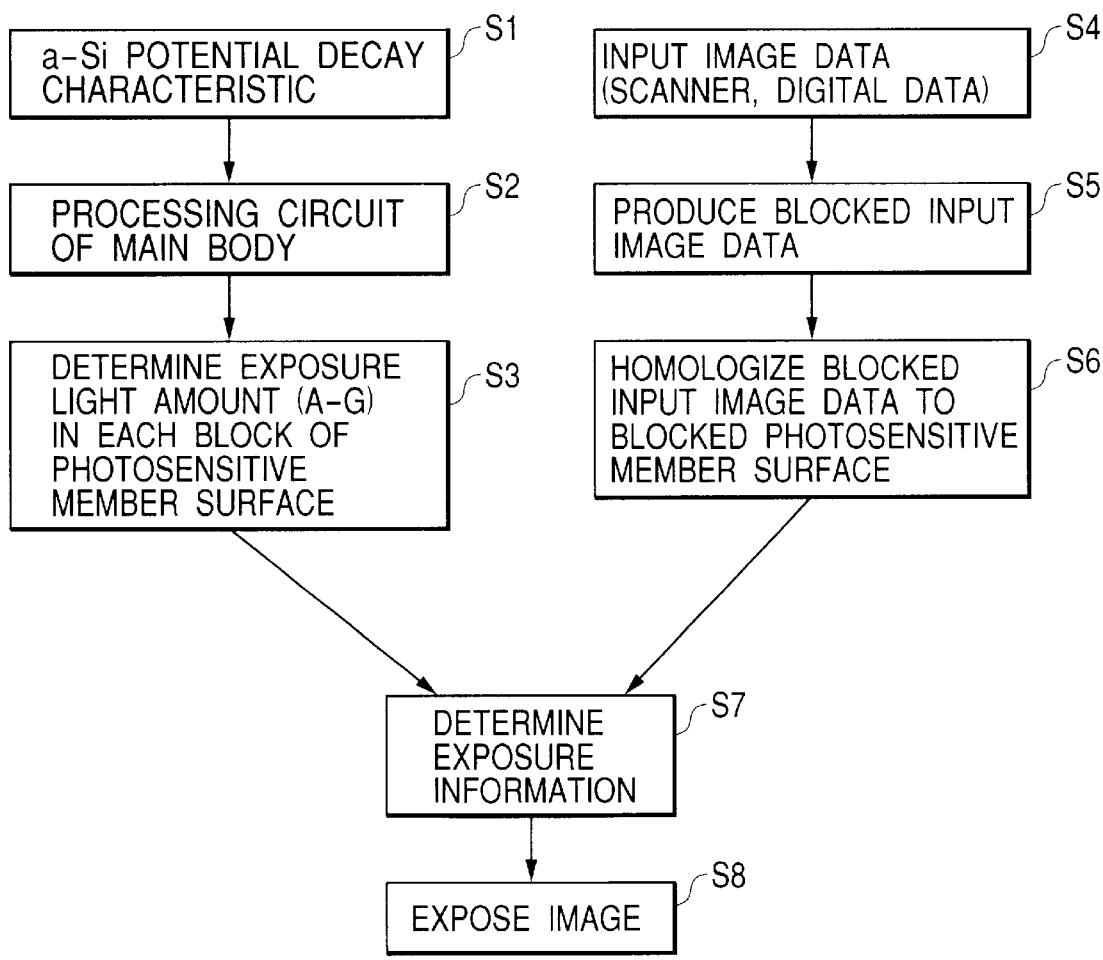
FIG. 2 is a flow chart showing the flow of an image output.

FIG. 2 shows the flow of an image output in the present embodiment.

First, how much the potential of the surface of the a-Si photosensitive member at the developing position after exposure recorded in the potential decay characteristic map shifts relative to the predetermined potential V1 (in the present embodiment, set to 30 V) is compared with the surface of a-Si photosensitive member classified into eight stages A–G at 6 V intervals with the center at V1 as shown in FIG. 3. That is, to which of the above-mentioned A–G each block corresponds is examined (step S1). The curve in FIG. 3 indicates the surface potential on the surface of the a-Si photosensitive member, for example, after the exposure by the exposure device 3 in the main scanning direction.

A: the range of (V1+15 V)<A
B: the range of (V1+9 V)<B<(V1+15 V)
C: the range of (V1+3 V)<C<(V1+9 V)
D: the range of (V1−3 V)<D<(V1+3 V)
E: the range of (V1−9 V)<E<(V1−3 V)
F: the range of (V1−15 V)<F<(V1−9 V)
G: the range of G<(V1−15 V)

Correspondingly to this classification, processing is effected by the processing circuit (not shown) of the main body A of the image forming apparatus (step S2), and each block of the entire area of the surface of the a-Si photosensitive member is classified into A to G as shown in FIG. 4, and the exposure light amount is set to eight stages in accordance with A to G so that the surface potential of each block of the surface of the a-Si photosensitive member may be within the range of D (step S3).

On the other hand, the input image has its entire area comparted into blocks corresponding to those of the surface of the photosensitive member and is image-processed (steps S4 and S5).

Next, the blocks of the surface of the a-Si photosensitive member and the blocks of the processed input image are homologized to each other (S6), and the laser light amount (exposure information) during the exposure in each block is determined (step S7), and image exposure is effected on the basis of the determined laser light amount (step S8).

As the result, on the entire area of the surface of the a-Si photosensitive member, it has become possible to uniformize the potential at the developing position after exposure, and it has become possible to obtain good output images free of uneven image density.

While in the foregoing, an image forming apparatus using an a-Si photosensitive member as an image bearing member having a particularly great effect has been described, the present invention can also be applied to other image bearing member than the a-Si photosensitive member, e.g. an OPC photosensitive member.

In the above-described embodiment, the memory chip may be constructed integrally with the a-Si photosensitive member or may be mounted on the main body side of the image forming apparatus except the a-Si photosensitive member.

As described above, according to the present invention, the surface of the image bearing member is comparted into a number of blocks and the exposure light amount of the exposure device is varied in accordance with the potential decay characteristic of each block, whereby the uneven potential at the developing position can be decreased and therefore, the uneven potential due to the difference in the film thickness or film gravity of the photosensitive layer of the image bearing member can be decreased to thereby form good images free of uneven image density. This is particularly effective when an a-Si photosensitive member is used as the image bearing member.

While the embodiment of the present invention has been described above, the present invention is not restricted to the above-described embodiment, but all modifications are possible within the technical idea of the present invention.

What is claimed is:

1. An image forming apparatus comprising:
    a photosensitive member;
    exposure means for exposing said photosensitive member which has been charged;
    storing means storing therein a characteristic table two-dimensionally representing a potential decay characteristic of a surface of said photosensitive member; and
    control means for controlling said exposure means based on said characteristic table stored in said storing means.

2. An image forming apparatus according to claim 1, wherein said control means controls an amount of light of said exposure means.

3. An image forming apparatus according to claim 1, wherein said photosensitive member is movable, and said storing means stores therein as said characteristic table the potential decay characteristic of each of a number of blocks into which the surface of said photosensitive member is divided in a direction orthogonal to a movement direction of said photosensitive member and in the movement direction.

4. An image forming apparatus according to claim 3, wherein said exposure means has a light source and deflecting means for deflecting a laser beam emitted from said light source, and the direction orthogonal to the movement direction of said photosensitive member is a scanning direction in which said photosensitive member is scanned by said deflecting means.

5. An image forming apparatus according to claim 3, wherein said blocks are set in conformity with a recording resolution of said exposure means.

6. An image forming apparatus according to claim 1, wherein said photosensitive member has a photoconductive layer.

7. An image forming apparatus according to claim 6, wherein said photoconductive layer is formed of a non-single crystal material containing at least one of hydrogen atoms and halogen atoms with silicon atoms as a base material.

8. An image forming apparatus according to claim 1, wherein said photosensitive member is movable and has detecting means for detecting a position in a movement direction of said photosensitive member.

9. An image forming apparatus according to claim 1, wherein said storing means is provided integrally with said photosensitive member.

10. An image forming apparatus according to claim 1, wherein said storing means is provided on a main body side of the image forming apparatus except said photosensitive member.

11. An image forming apparatus comprising:

a movable photosensitive member;

exposure means for exposing said photosensitive member which has been charged;

storing means storing therein a potential decay characteristic of a surface of said photosensitive member with respect to a direction orthogonal to a movement direction of said photosensitive member; and control means for controlling said exposure means based on said potential decay characteristic stored in said storing means.

12. An image forming apparatus according to claim 11, wherein said control means controls an amount of light of said exposure means.

13. An image forming apparatus according to claim 11, wherein said exposure means has a light source and deflecting means for deflecting a laser beam emitted from said light source, and the direction orthogonal to the movement direction of said photosensitive member is a scanning direction in which said photosensitive member is scanned by said deflecting means.

14. An image forming apparatus according to claim 11, wherein said photosensitive member has a photoconductive layer.

15. An image forming apparatus according to claim 14, wherein said photoconductive layer is formed of a non-single crystal material containing at least one of hydrogen atoms and halogen atoms with silicon atoms as a base material.

16. An image forming apparatus according to claim 11, wherein said storing means is provided integrally with said photosensitive member.

17. An image forming apparatus according to claim 11, wherein said storing means is provided on a main body side of the image forming apparatus except said photosensitive member.

* * * * *